F. M. HAWKINS.
AUTOMATIC SHUTTER FOR POULTRY HOUSES AND THE LIKE.
APPLICATION FILED MAR. 26, 1915.

1,163,663.

Patented Dec. 14, 1915.

Witnesses
J. R. Tomlin
R. L. Parker.

F. M. Hawkins
Inventor,
by C. A. Snow & Co.
Attorneys.

UNITED STATES PATENT OFFICE.

FLETCHER M. HAWKINS, OF PENIEL, TEXAS.

AUTOMATIC SHUTTER FOR POULTRY-HOUSES AND THE LIKE.

1,163,663.  Specification of Letters Patent.  Patented Dec. 14, 1915.

Application filed March 26, 1915. Serial No. 17,232.

*To all whom it may concern:*

Be it known that I, FLETCHER M. HAWKINS, a citizen of the United States, residing at Peniel, in the county of Hunt and State of Texas, have invented a new and useful Automatic Shutter for Poultry-Houses and the like, of which the following is a specification.

This invention relates to automatic shutters for poultry houses and like structures, one of the objects of the invention being to provide a normally raised shutter so constructed as to accumulate rain water and thus move to closed position automatically under the added weight of the water, the shutter remaining in closed position as long as the rain water is supplied thereto but being gradually drained so that it will reopen automatically after the rain has ceased.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
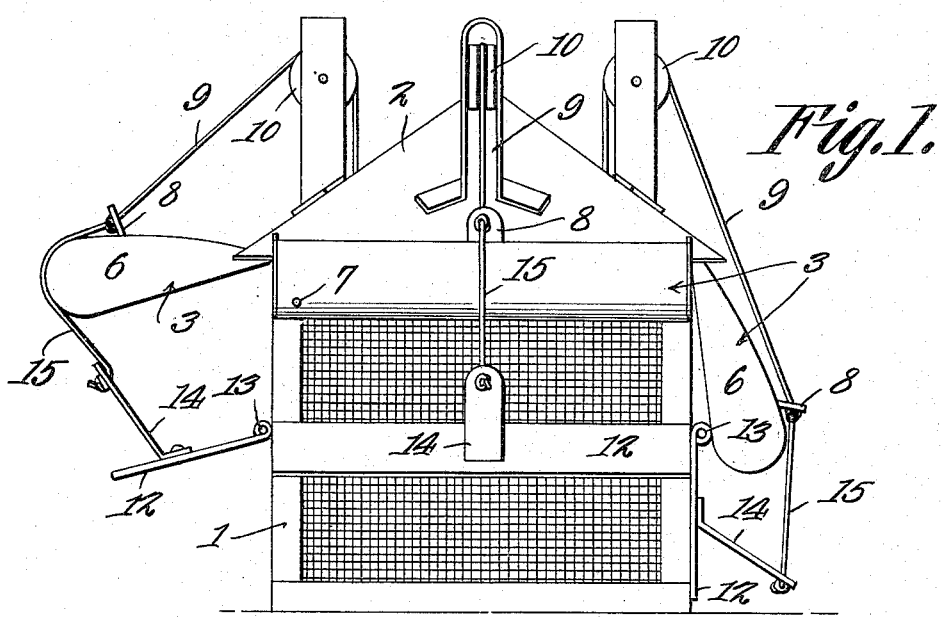
Figure 2:
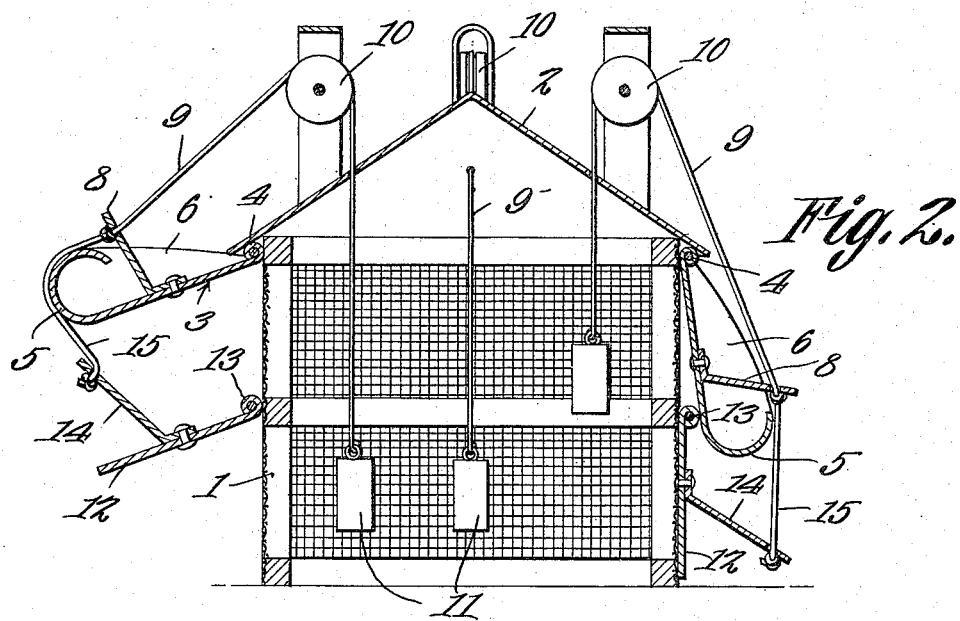

In said drawings: Figure 1 is an elevation of a poultry house having the present improvements combined therewith, the shutter on one side of the poultry house being open and the shutter on the opposite side being closed. Fig. 2 is a central vertical transverse section through the structure shown in Fig. 1.

Referring to the figures by characters of reference 1 designates a poultry house or other structure having four open sides and provided with a pyramidal roof 2. The eaves of the roof overhang the upper edges of the shutters 3 which are pivotally connected by rods 4 or in any other suitable manner to the walls of the structure 1 and are provided along their outer longitudinal edges with gutters 5 so shaped as to retain water whether the shutter is in a horizontal or in a vertical position. Flanges 6 extend outwardly from the ends of each shutter 3 and constitute closures for the ends of the gutters 5. Each gutter has a small leak opening 7 in the bottom thereof. Outstanding from each of the shutters 3 is an arm 8 to which is secured a cord 9 or any other suitable flexible connection which is mounted on a guide sheave 10 and extends downwardly from said sheave, there being a weight or counterbalance 11 secured to the cord as shown.

Each open side of the structure 1 is provided with a shutter 3 such as has been described and with a weighted cord 9, the weight on the cord being such as to hold the shutter 3 normally elevated or open so as to constitute a roof section for providing shade. When, however, any material weight is added to the shutter, as when rain water is discharged thereonto, the weight 11 will be overbalanced and the shutter 3 permitted to swing downwardly to closed position, the accumulated water remaining in the gutter 5 but gradually leaking therefrom through the opening 7. As soon as the rain ceases the supply of water within the gutters will be gradually reduced and when the weight of each shutter and the load carried thereby becomes less than that of the weight 11, the shutter will be raised automatically to its open position. It will be understood that by providing a pyramidal roof, the water draining from the roof will be directed onto the respective shutters. Furthermore by providing independent weights for the shutters, the shutter at one side of the structure 1 can close while the remaining shutters are left open, this being especially advantageous where the structure 1 is subjected to a beating rain from one direction which, in the present instance, would result in the shutter closing at the storm side of the structure 1, while the remaining shutters will be held open to permit desired ventilation.

Where the structure 1 is of considerable height, the shutters 3 can be provided with supplemental shutters 12 pivotally mounted thereunder as at 13, each supplemental shutter having an arm 14 to which a cord 15 is secured, this cord if desired being a continuation of the cord 9 and being extended partly around the adjacent gutter 5. Thus when shutter 3 is raised, cord 15 will pull upwardly on arm 14 and raise the shutter 12 thereunder and, when shutter 3 is moved to closed position under the action of the water accumulated thereby, the shutter 12 thereunder will gravitate to its closed position. While only one supplemental shutter has been shown under each of the shutters 3, it is to be understood that the number of such shutters used can be multiplied as desired.

What is claimed is:—

1. The combination with a building structure having a window opening or the like, of a hingedly mounted shutter and means upon the shutter for accumulating rain water to shift the shutter and close said opening, and a counter balance for holding the shutter normally elevated to constitute a roof section.

2. The combination with a building structure having a window opening or the like, of a hingedly mounted shutter and means upon the shutter for accumulating rain water to shift the shutter and close said opening, and a counter balance for holding the shutter normally elevated to constitute a roof section, said shutter having a leak opening to permit the gradual discharge of accumulated water therefrom.

3. The combination with a building structure having a window opening or the like and a counter balanced shutter hingedly connected thereto and normally constituting a roof section, of means upon the shutter for accumulating rain water, thereby to overbalance the shutter and close the opening.

4. The combination with a building structure having a window opening or the like and a counter balanced shutter hingedly connected thereto and normally constituting a roof section, of means upon the shutter for accumulating rain water, thereby to overbalance the shutter to close the opening, there being a leak opening for permitting the gradual escape of the accumulated water from the shutter.

5. The combination with a structure and a counter balanced shutter hingedly connected thereto, of means upon the shutter for accumulating rain water, thereby to overbalance and close the shutter, a supplemental shutter below the first named shutter, and a flexible connection between the two shutters.

6. The combination with a structure and a counter balanced shutter hingedly connected thereto, of means upon the shutter for accumulating rain water, thereby to overbalance and close the shutter, a supplemental shutter below the first named shutter, and a flexible connection between the two shutters, said water accumulating shutter having an opening to permit the gradual escape of the accumulated water.

7. The combination with a house having an inclined roof, and open walls, of a hinged shutter for closing each of the open walls, a gutter upon each of said shutters, upstanding side flanges upon each shutter constituting closures for the ends of the gutter, a counterbalance connected to each shutter for holding it normally in raised or open position to receive water from the roof, said shutter being movable to closed position under the action of accumulated water.

8. The combination with a house having an inclined roof, and open walls, of a hinged shutter for closing each of the open walls, a gutter upon each of said shutters, upstanding side flanges upon each shutter constituting closures for the ends of the gutter, a counterbalance connected to each shutter for holding it normally in raised or open position to receive water from the roof, said shutter being movable to closed position under the action of accumulated water, there being a drain opening in the gutter to permit the gradual escape of the accumulated water.

9. The combination with a house having an inclined roof, and open walls, of a hinged shutter for closing each of the open walls, a gutter upon each of said shutters, upstanding side flanges upon each shutter constituting closures for the ends of the gutter, a counterbalance connected to each shutter for holding it normally in raised or open position to receive water from the roof, said shutter being movable to closed position under the action of accumulated water, there being a drain opening in the gutter to permit the gradual escape of the accumulated water, a supplemental shutter under each of the first named shutters, and flexible connections between the upper and lower shutters.

10. The combination with a building structure having an opening, of a normally open shutter constituting a roof section, and means on the shutter for accumulating rain water to shift the shutter to close the opening.

11. The combination with a building structure having an opening, of a normally open shutter constituting a roof section, and means on the shutter for accumulating rain water to shift the shutter and close the opening, said means having a leak opening, and means for automatically opening the shutter upon the escape of the accumulated water.

In testimony that I claim the foregoing as my own, I have hereto affixed my signature in the presence of two witnesses.

FLETCHER M. HAWKINS.

Witnesses:
B. O. De Jernett,
Herbert Mitchell.

Copies of this patent may be obtained for five cents each, by addressing the "Commissioner of Patents, Washington, D. C."